United States Patent Office 3,160,668
Patented Dec. 8, 1964

3,160,668
HYDROPEROXIDE FORMATION
William R. Davie, Aliquippa, and Joachim C. E. Schult, Pittsburgh, Pa., assignors to Pittsburgh Chemical Company, Pittsburgh, Pa., a corporation of Pennsylvania
No Drawing. Filed June 19, 1961, Ser. No. 117,832
2 Claims. (Cl. 260—610)

This invention relates to improvements in the production of aralkyl hydroperoxides, more specifically, cumene hydroperoxide.

It is an object of the present invention to initiate and accelerate the oxidation of an aralkyl hydrocarbon to an aralkyl hydroperoxide in an improved fashion.

A more specific object is to devise a novel method for the air oxidation of cumene to cumene hydroperoxide.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by oxidizing an aralkyl hydrocarbon having the formula

with an oxygen containing gas in the presence of a primary amine having a tertiary alkyl group attached to the amino nitrogen. In the above formula Ar is an aromatic hydrocarbon radical selected from the group consisting of aryl and alkaryl and R and R represent the same or different hydrocarbon radicals such as alkyl, cycloalkyl, aryl, aralkyl, alkaryl, etc.

Examples of hydroperoxides which can be prepared by the oxidation of the corresponding aromatic hydrocarbon according to the invention are:

Cumenehydroperoxide,
α-Ethyl-α-methylbenzyl hydroperoxide,
α,α-Dimethyl-p-methylbenzyl hydroperoxide,
α,α-Dimethyl-p-isopropyl benzyl hydroperoxide,
Cyclohexyl benzene hydroperoxide,
α,α-Dimethylnaphthylmethyl hydroperoxide,
α,α,α',α'-Tetramethyl-p-xylylene dihydroperoxide.

As the oxidizing agent there can be utilized air or other oxygen containing gas, e.g., pure oxygen.

The temperature of reaction is not critical and can be as low as room temperature. To increase the reaction rate, more elevated temperatures, e.g., 50–120° C., are employed. Preferably, a temperature of 100–110° C. is utilized.

The presently preferred amines for use as the accelerator are mixtures available under the trademarks Primene JMT and Primene 81–R. These are mixtures of amines having the formula

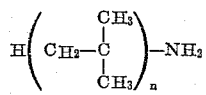

wherein $n$ is 3 to 6. There can be employed other amines of this general formula where $n$ is 1 to 10, for example. Thus, there can be used tertiary butyl amine. Other tertiary alkyl primary amines which can be employed are tertiary amyl amine, 3-methyl-3-aminopentane, 2-methyl-2-aminopentane, 2-ethyl-2-aminobutane, 4-methyl-4-aminoheptane. It will be observed that the amines set forth above have 4 to 40 carbon atoms. The tertiary butyl and amyl amines because of their volatility are not as effective as other less volatile amines in the series since these amines tend to be swept out of the reaction by the excess oxidizing agent.

The proportion of tertiary alkyl primary amine to use to obtain optimum conditions will vary to some extent in accordance with the amount and nature of impurities present in the aromatic compound, e.g., cumene, to be oxidized. Generally, 0.01 to 1% by weight of the amine has been found to be most advantageous, although lower or higher proportions are within the scope of the invention. The amine can be added to the cumene or other aromatic hydrocarbon to be oxidized or, alternatively, it can be added to the oxidizing gas.

The amines of the present invention should not be confused with the cyclic tertiary amines such as pyridine and quinoline, dimethyl pyridine, etc. In such cyclic amines, the amine nitrogen is not bonded to any hydrogen, while, in contrast, the amine nitrogen of the tertiary alkyl primary amines of the instant invention is bonded to two hydrogen atoms.

The effectiveness of the tertiary alkyl primary amines over the straight chain primary amines is due largely to their surprising resistance to oxidation by peroxides and other oxidizing agents.

Example 1

In a 32 x 300 mm. test tube equipped with a capillary sparger, Claisen adapter and reflux condenser were charged 50 grams of cumene and 0.2 cc. of Primene JMT. The test tube was immersed in a thermostatically controlled oil bath, maintained at 105±5° C. The temperature of the reaction mixture and oil bath was allowed to equalize. Then air was passed through the cumene at a rate of approximately 10 liters per hour. After a reaction time of 2.5 hours, the mixture was cooled and analyzed for cumene hydroperoxide. It was found that the reaction mixture contained 11.92% by weight of cumene hydroperoxide.

Example 2

A similar experiment using the reaction conditions of Example 1 with 0.1 cc. of Primene 81–R as the amine and a reaction time of four hours produced 11.7% by weight of cumene hydroperoxide.

Example 3

The use of 0.2 cc. of tertiary butylamine as the amine and a reaction time of four hours under the reaction conditions of Example 1 produced 8.5% by weight of cumene hydroperoxide.

Example 4

By way of contrast octadecylamine, a long straight chain primary amine (Armeen 18D) of approximately the same molecular weight as Primene 81–R and Primene JMT, at the same concentration level produced only 1.1% cumene hydroperoxide in four hours. This was even less than a control that contained no catalyst and which produced 1.9% cumene hydroperoxide in four hours.

Example 5

Secondary butyl benzene (in place of cumene) treated in the same apparatus in the same manner as in Example 1 in the presence of 0.1 cc. Primene 81–R as the amine for four hours gave a reaction mixture that by analysis was found to contain 13.3% α-methyl-α-ethylbenzyl hydroperoxide.

Example 6

P-cymene similarly treated for four hours at 105° C.±5° C. in the presence of 0.1 cc. of Primene JMT gave a reaction mixture containing 9.8% α,α-dimethyl-P-methylbenzyl hydroperoxide.

*Example 7*

P-diisopropyl benzene treated as in Example 6 for four hours in the presence of 0.2 cc. of Primene 81-R gave a reaction mixture that was found to contain 3.8% by weight of hydroperoxide (—OOH) groups. Hydrolysis of the reaction product in 100 cc. of 40% sulfuric acid at 60° C. for four hours in the presence of a surfactant resulted in an aqueous phase that gave a qualitative test for hydroquinone.

*Example 8*

Cyclohexyl benzene (50 g.) treated two hours in the presence of 0.2 cc. Primene 81-R at 110° C. produced a 6.2% yield of cyclohexyl benzene hydroperoxide.

*Example 9*

Isopropyl naphthalene mixture (50 g.) treated two hours in the presence of 0.2 cc. Primene 81-R at 110° C. was found to contain 5.7% of isopropyl naphthalene hydroperoxide.

What is claimed is:

1. In a process for the production of an alpha, alpha-dialkyl arylmethyl hydroperoxide-containing reaction mixture by the interaction of an alpha, alpha-dialkyl arylmethane selected from the group consisting of cumene, secondary butyl benzene, p-cymene, cyclohexyl benzene, and isopropyl naphthalene with an oxygen-containing gas, the improvement of effecting said reaction in the presence of a tertiary alkyl primary amine having the formula

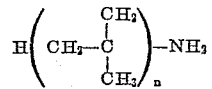

wherein $n$ is an integer from 3 to 6 inclusive.

2. In a process for the production of a cumene hydroperoxide-containing reaction mixture by the interaction of cumene with an oxygen-containing gas, the improvement of effecting the reaction in the presence of a tertiary alkyl primary amine having the formula

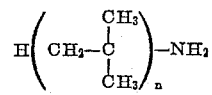

wherein $n$ is an integer from 3 to 6 inclusive.

References Cited by the Examiner
FOREIGN PATENTS
558,506  6/58  Canada.

LEON ZITVER, *Primary Examiner.*